(12) United States Patent
Shimanuki

(10) Patent No.: US 10,394,496 B2
(45) Date of Patent: Aug. 27, 2019

(54) IMAGE FORMING APPARATUS, IMAGE FORMING SYSTEM, SETTING METHOD AND COMPUTER-READABLE MEDIUM

(71) Applicant: Oki Data Corporation, Tokyo (JP)

(72) Inventor: Toshihiro Shimanuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/438,093

(22) Filed: Feb. 21, 2017

(65) Prior Publication Data

US 2017/0269877 A1 Sep. 21, 2017

(30) Foreign Application Priority Data

Mar. 18, 2016 (JP) ................................. 2016-054686

(51) Int. Cl.
*G06F 3/12* (2006.01)
*G06K 15/02* (2006.01)
*H04N 1/00* (2006.01)

(52) U.S. Cl.
CPC ............ *G06F 3/121* (2013.01); *G06F 3/1204* (2013.01); *G06F 3/1231* (2013.01); *G06F 3/1254* (2013.01); *G06F 3/1255* (2013.01); *G06F 3/1256* (2013.01); *G06F 3/1285* (2013.01); *G06K 15/024* (2013.01); *G06K 15/1823* (2013.01); *H04N 1/00694* (2013.01); *H04N 1/00708* (2013.01); *G06K 2215/0097* (2013.01)

(58) Field of Classification Search
CPC combination set(s) only.
See application file for complete search history.

(56) References Cited

U.S. PATENT DOCUMENTS

| 2002/0085186 A1* | 7/2002 | Sawada ................ G03B 27/52 355/40 |
| 2017/0010767 A1* | 1/2017 | Hosoda ................ G06F 3/0482 |
| 2017/0257503 A1* | 9/2017 | Tsukada ............. H04N 1/00708 |
| 2017/0337852 A1* | 11/2017 | Oster .................... G09F 3/0295 |

FOREIGN PATENT DOCUMENTS

| JP | 2004318817 A | 11/2004 |
| JP | 2005017708 A | 1/2005 |
| JP | 2009208418 A | 9/2009 |
| JP | 2015210369 A | 11/2015 |

* cited by examiner

*Primary Examiner* — Helen Zong
(74) *Attorney, Agent, or Firm* — Panitch Schwarze Belisario & Nadel LLP

(57) ABSTRACT

An image forming apparatus includes a storage section that stores a medium setting including information representing a printing area on a printing medium, a printing section that performs printing on the printing medium based on the medium setting stored in the storage section, a determining section that determines whether a first medium setting included in a print job sent from an information processing apparatus and including information representing a printing area on a printing medium differs from a second medium setting stored as the medium setting in the storage section, and a controller that changes the medium setting stored in the storage section from the second medium setting to the first medium setting, when the determining section determines that the first medium setting differs from the second medium setting.

16 Claims, 6 Drawing Sheets

IMAGE FORMING APPARATUS, IMAGE FORMING SYSTEM, SETTING METHOD AND COMPUTER-READABLE MEDIUM

BACKGROUND OF THE INVENTION

The present invention relates to an image forming apparatus, an image forming system including the image forming apparatus, and a setting method for the image forming apparatus. The present invention also relates to a computer-readable medium storing a program and mounted in the image faulting apparatus.

A general image forming apparatus has a function to perform printing on an elongated printing medium such as a rolled label sheet based on a print job received from an information processing apparatus connected to the image forming apparatus. Such an image forming apparatus includes an operation panel that allows a user to set a size of the printing medium, a printing area on the printing medium or the like (i.e., a sheet setting).

Further, Japanese Patent Application Publication No. 2009-208418 discloses a printer having a function to perform printing on an elongated printing sheet. When the printer detects that no printing sheet is set therein, the printer becomes capable of receiving an update command of sheet setting information from an external device. When the printer receives the update command, the printer updates the sheet setting information based on the update command. After the printer detects that the printing sheet is set therein, the printer carries the printing sheet, and determines whether the printing sheet matches the sheet setting information. When the printing sheet (for example, a rolled sheet) is replaced with a printing medium of a different kind, the printer can update the sheet setting information based on the update command sent from the external device, without causing a sheet mismatch error.

The general image forming apparatus outputs an error notification indicating a mismatch between sheet sizes or the like, when the sheet setting of the image forming apparatus and the sheet setting sent from the information processing apparatus do not match each other. In order to solve the error and restore the image forming apparatus, it is necessary to replace the printing sheet.

Particularly, in the image forming apparatus configured to perform printing on an elongated printing sheet such as a rolled label sheet, various kinds of printing sheets may be set. Therefore, it is necessary to update the sheet setting of the image forming apparatus every time the printing sheet is set in the image forming apparatus. If there is no other way than replacing the printing sheet to recover the image forming apparatus from the error, operability may be poor.

For example, the image forming apparatus configured to perform printing on the rolled label sheet has a large number of setting items such as a size, a kind and a thickness of the label sheet. The setting items also include, for example, an interval of the label sheets, a method for detecting a leading edge of the label sheet, a width of a base sheet, and a distance between the label sheet and the base sheet. The image forming apparatus may be provided with a sensor for detecting the printing sheet. However, some setting items are difficult to automatically detect. Therefore, when a user replaces the rolled label sheet, it is necessary for the user to update the sheet setting using an operation panel of the image forming apparatus.

Therefore, there may be a case where a user fails to update the sheet setting upon replacing the rolled label sheet, and where the user performs printing while specifying the correct sheet setting using a printer driver. In such a case, the sheet setting of the new label sheet and the sheet setting specified using the printer driver match each other. However, the sheet setting (which is not updated) of the image forming apparatus does not match the sheet setting specified using the printer driver, and therefore a sheet mismatch error may occur.

Furthermore, in the image forming apparatus configured to perform printing on a rolled sheet such as a rolled label sheet, printing may be terminated in a state where the rolled sheet is left uncut in the image forming apparatus. In such a case, the image forming apparatus may be driven to perform printing (i.e., forced printing) while ignoring the sheet mismatch error so as not to reduce operability. However, if printing is performed in a state where the sheet setting of the rolled sheet (left in the image forming apparatus) do not match the sheet setting of the image forming apparatus, a printing failure may occur.

In this regard, the printer disclosed by the above described publication updates the sheet setting information based on the update command sent from the external device. However, it is necessary for a user to take out the rolled sheet from the printer, send the update command to the printer from the external device, and mount a new rolled sheet to the printer. There is a possibility that a user may fail to follow this procedure.

SUMMARY OR THE INVENTION

The present invention is intended to provide an image forming apparatus storing a medium setting and capable of updating the medium setting to a correct medium setting included in a print job sent from an information processing apparatus.

According to an aspect of the present invention, there is provided an image forming apparatus including a storage section that stores a medium setting including information representing a printing area on a printing medium, a printing section that performs printing on the printing medium based on the medium setting stored in the storage section, a determining section that determines whether a first medium setting included in a print job sent from an information processing apparatus and including information representing a printing area on a printing medium differs from a second medium setting stored as the medium setting in the storage section, and a controller that changes the medium setting stored in the storage section from the second medium setting to the first medium setting, when the determining section determines that the first medium setting differs from the second medium setting.

With such a configuration, when the image forming apparatus receives the print job including the correct medium setting (i.e., the first medium setting) from the information processing apparatus, and when the first medium setting included in the print job differs from the second medium setting set in the image forming apparatus, the second medium setting is overwritten with the first medium setting included in the print job.

According to another aspect of the present invention, there is provided an image forming system including an information processing apparatus and an image forming apparatus. The information processing apparatus includes a sending section that sends a print job to the image forming apparatus. The print job includes a first medium setting including information representing a printing area on a printing medium forming apparatus includes a storage section that stores a medium setting including information representing the printing area on the printing medium, a printing section that performs printing on the printing medium based on the medium setting stored in storage section, a receiving section that receives the print job sent from the information processing apparatus, a determining section that determines whether a first medium setting included in the print job received by the receiving section differs from a second medium setting stored as the medium setting in the storage section, and a controller that changes the medium setting stored in the storage section from the second medium setting to the first medium setting, when the determining section determines that the first medium setting differs from the second medium setting.

According to still another aspect of the present invention, there is provided a setting method for an image forming apparatus. The method includes the steps of determining whether a first medium setting included in a print job sent from an information processing apparatus and including information representing a printing area on a printing medium differs from a second medium setting stored as a medium setting in a storage section of the image forming apparatus, and changing the medium setting stored in the storage section from the second medium setting to the first medium setting, when it is determined that the first medium setting differs from the second medium setting in the determining step.

According to yet another aspect of the present invention, there is provided a computer-readable medium storing a computer program and mounted in an image forming apparatus. The image forming apparatus includes a storage section that stores a medium setting including information representing, a printing area on a printing medium, a printing section that performs printing on the printing medium based on the medium setting stored in the storage section, and a controller. The computer program causes the controller to perform processing including the steps of determining whether a first medium setting included in a print job sent from an information processing apparatus and including information representing a printing area on a printing medium differs from a second medium setting stored as a medium setting in the storage section of the image forming apparatus, and changing the medium setting stored in the storage section from the second medium setting to the first medium setting, when it is determined that the first medium setting differs from the second medium setting in the determining step.

DETAILED DESCRIPTION OF THE PREFERRED EMBODIMENT

Hereinafter, an image forming apparatus, an image forming system including the image forming apparatus and an information processing apparatus, a setting method for the image forming apparatus, and a computer-readable medium storing a program mounted in the image forming apparatus will be described with reference to FIGS. 1 through 9.

Figure 1:
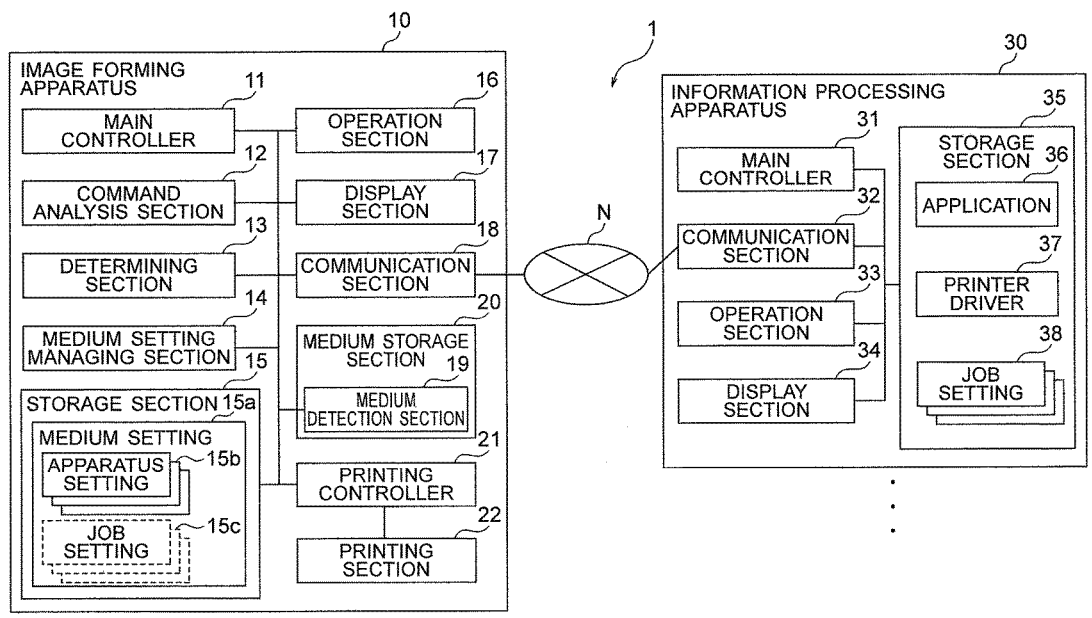
FIG. 1 is a block diagram showing a configuration example of an image forming system according to an embodiment of the present invention.

FIG. 1 is a block diagram showing a configuration example of an image forming system according to the embodiment. As shown in FIG. 1, the image forming system 1 according to the embodiment includes an image forming apparatus 10 and an information processing apparatus 30. The information processing apparatus 30 is connected with the image forming apparatus 10 via a data communication channel N, and sends a print job to the image forming apparatus 10. The data communication channel N is a communication channel for the print job, and includes communication interface (I/F) such as a USB (Universal Serial Bus) or a LAN (Local Area Network).

In this regard, it is also possible that the image forming system 1 includes a plurality of information processing apparatuses 30. In such a case, each information processing apparatus 30 may send a print job to the image forming apparatus 10. Further, it is also possible that the image forming system 1 includes a printing server (not shown). In such a case, the information processing apparatus 30 may send a print job to the image forming apparatus 10 through the printing server.

First, a configuration of the information processing apparatus 30 will be described. The information processing apparatus 30 includes a main controller 31, a communication section 32, the operation section 33, a display section 34, and storage section 35. The main controller 31 includes, for example, a CPU (Central Processing Unit) or the like. The main controller 31 controls an entire operation of the information processing apparatus 30 including the communication section 32, the operation section 33, the display section 34 and the storage section 35.

The storage section 35 stores, for example, an application program (i.e., an application) 36, a printer driver 37 for the image forming apparatus 10, and a job setting 38. The application 36 and the printer driver 37 are installed in the information processing apparatus 30 so that the main controller 31 can read and perform the application 36 and the printer driver 37. In this regard, an operation system program is installed in the main controller 31 for performing the application 36 and the printer driver 37.

The application 36 is software for creating and editing document data which is an object to be printed by the image forming apparatus 10. The printer driver 37 is read when printing is instructed by the application 36. The printer driver 37 refers to the job setting 38, converts the document data into printing data, and creates a print job including the printing data. The printer driver 37 outputs the print job to the image forming apparatus 10 via the communication section 32.

The communication section 32 is an interface for sending the print job created by the printer driver 37 to the image forming apparatus 10 via the data communication channel N. It is only necessary that the communication section 32 has at least a function to send the print job. That is, the communication section 32 may be a sending section that sends the print job. Further, the operation section 33 is configured to accept a user's operation. The operation section 33 (i.e., an operation device) may be, for example, a keyboard or a pointing device. The display section 34 may be a display panel such as an LCD (Liquid Crystal Display). The storage section 35 is a storage device constituted by, for example, a hard disk or a semiconductor memory.

Figure 2:
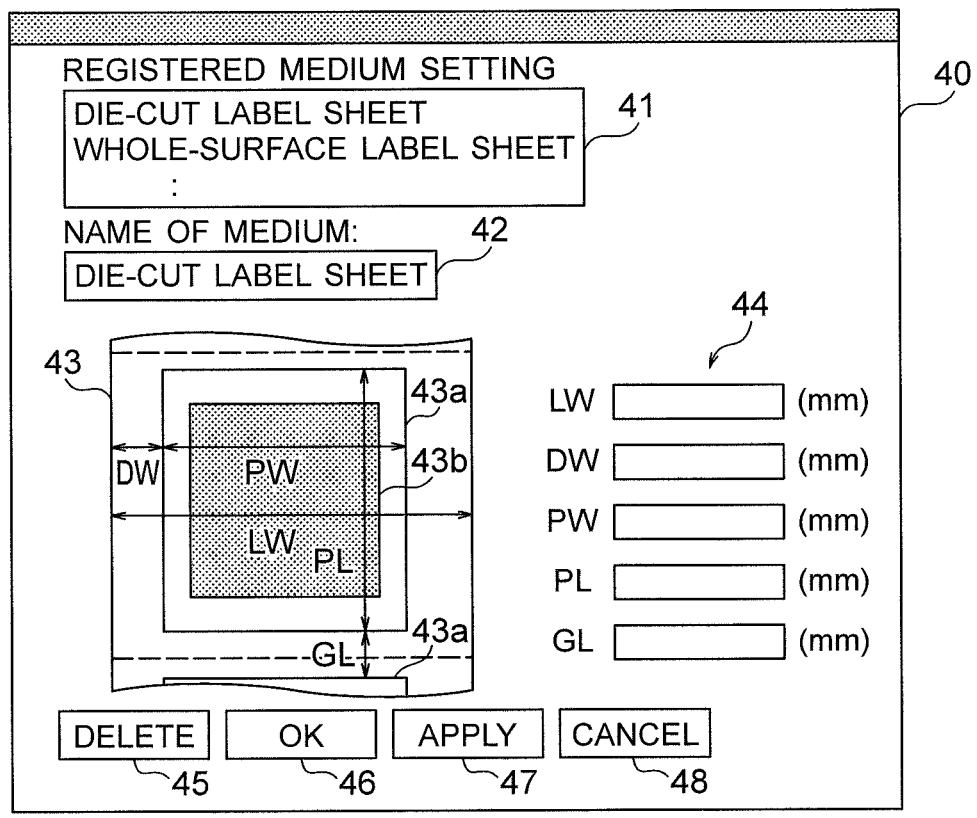
FIG. 2 is a schematic view showing an example of an image displayed on a display section of an information processing apparatus of the image forming system shown in FIG. 1.

Here, an example of sheet setting processing using the printer driver 37 will be described with reference to FIG. 2. FIG. 2 is a schematic view showing an example of an image displayed on the display section 34 of the information processing apparatus 30, and illustrating an example of a setting image included in the printer driver 37.

The job setting 38 includes a group of setting values. To be more specific, the job setting 38 includes a plurality of setting items of a printing medium (i.e., a printing sheet) set in the image forming apparatus 10. The setting items include, for example, a width and a length of a label of the printing medium, an interval between the labels, a width of a base sheet (i.e., a substrate), and a distance between edges of the base sheet and the label. In other words, the job setting 38 is a sheet setting required for printing. The printing sheet is not limited to paper. That is, a printing medium other than paper may be used. The sheet setting may also be referred to as a medium setting.

The job setting 38 is stored (registered) in the storage section 35 using the printer driver 37. An image 40 shown in FIG. 2 is a GUI (Graphical User Interface) image included in the printer driver 37. The image 40 includes a list 41 of registered medium setting items (i.e., a registered medium setting list 41), a display portion 42 showing a name of the medium setting (i.e., a name of the printing medium) selected among the list 41 as an edition target, a schematic diagram 43 showing the selected medium setting, an input portion 44 for inputting dimensions of the printing medium and the label, a delete button 45, an OK button 46, an apply button 47 and a cancel button 48.

A user activates the printer driver 37, causes the display section 34 to display the image 40, selects an edition target from the registered medium setting list 41, causes the display portion 42 to display the selected printing medium (or inputs a name of new medium setting), and inputs dimensions in the input portion 44 referring to the schematic diagram 43. In this regard, it is preferable that a ratio of dimensions of the schematic diagram 43 changes based on values input at the input portion 44. In the image 40 shown in FIG. 2, a die-cut label sheet, a whole-surface label sheet or the like can be selected among the registered medium setting list 41 registered in the storage section 35. Further, as shown in FIG. 2, the input portion 44 includes a width of the printing medium (i.e., a width of the base sheet) LW, a length PL and a width PW of the label 43a, a distance DW from an edge of the printing medium to an edge of the label 43a (i.e., a distance between the base sheet and the label), and an interval GL between the labels 43a (i.e., a label interval). However, setting items are not limited to this example. For example, when a printing area 43b is a part of the label 43a, the input portion 44 may be configured to accept an input of the printing area 43b.

When a user operates the operation section 33 to input respective setting values in the input portion 44 and press the apply button 47, the printer driver 37 causes the storage section 35 to store the job setting 38 including input setting values. Further, when the cancel button 48 is pressed, the printer driver 37 discards the job setting 38 (which is not applied at the time), and shifts to another image. Further, when the delete button 45 is pressed in a state where a deletion target is selected from the registered medium setting list 41, the printer driver 37 deletes the job setting 38 of the deletion target.

In this way, the printer driver 37 enables a user to input, register, edit and delete setting values. The job setting 38 includes at least information indicating the printing area on the printing medium. The job setting 38 may also include a size and a thickness of the printing medium (i.e., a general setting item).

Further, when the OK button 46 is pressed in a state where the job setting 38 for document data to be printed among the registered medium setting list 41, the printer driver 37 does not display the image 40 (or shifts to another image), and selects the job setting 38 for the document data to be printed. Then, the printer driver 37 applies the job setting 38 to the document data to create a print job. The print job created in this way includes the job setting 38 (i.e., a first medium setting). The job setting 38 may be included in the print job as, for example, a sheet setting command. However, the print job may include the job setting 38 in any form as long as the print job includes content of the job setting 38.

Next, a configuration of the image forming apparatus 10 will be described. As shown in FIG. 1, the image forming apparatus 10 includes a main controller 11, a command analysis section 12, a determining section 13, a medium setting managing section (controller) 14, a storage section 15 storing a medium setting (i.e., a sheet setting) 15a, an operation section 16, a display section 17, a communication section 18, a medium detection section (i.e., a sheet detection section) 19, a medium storage section 20, a printing controller 21, and a printing section 22. The main controller 11 includes, for example, a CPU or an ASIC (Application Specific Integrated Circuit). The main controller 11 controls an entire operation of the image forming apparatus 10 including the command analysis section 12, the determining section 13, the medium setting managing section 14, the storage section 15, the operation section 16, the display section 17, the communication section 18, the medium detection section 19, and the printing controller 21.

In this regard, part of processing of the medium setting managing section 14 may also be performed by the main controller 11. Further, the image forming apparatus 10 is not limited to a configuration shown in FIG. 1. It is only necessary that the image forming apparatus 10 includes the determining section 13, the medium setting managing section 14, and the storage section 15. For example, the medium detection section 19 becomes dispensable when processing of the image forming apparatus 10 does not need the medium detection section 19.

The operation section (i.e., an operation device) 16 is configured to accept a user's operation. The operation section 16 includes, for example, a plurality of button switches.

When a user (operator) presses the button switches, the medium setting managing section 14 causes the display section 17 to display an apparatus setting 15b. The medium setting managing section 14 enables a user to input, select and change the setting items of the apparatus setting 15b. It is preferable that the storage section 15 stores the apparatus setting 15b input by the user at the operation section 16.

The display section (i.e., a display device) 17 may include a display panel such as, for example, a plurality of LEDs (Light Emitting Diodes) or an LCD. The LEDs may be configured to emit light according to a state (i.e., a standby state, a period during receiving a print job, a period during printing, or the like) of the image forming apparatus 10. Further, the display section 17 may also display guidance and various information for a user operating the image forming apparatus 10, and information indicating the apparatus setting (i.e., a second medium setting) 15b which is a medium setting of the image forming apparatus 10.

The medium setting managing section 14 manages the medium setting 15a stored in the storage section 15. The storage section 15 may be a storage device such as a hard disk, a semiconductor memory or the like. As shown in FIG. 1, the medium setting 15a is a group of setting values, i.e., a plurality of setting items. The medium setting 15a includes the apparatus setting (i.e., the second medium setting) 15b, and may also temporarily include the job setting 15c. The apparatus setting 15b and the job setting 15c include at least information indicating a printing area on the printing medium.

The apparatus setting 15b is a group of setting values on the printing medium (including information indicating the printing area on the printing medium) set in the image forming apparatus 10. The apparatus setting 15b includes, for example, a group of setting values (setting items) such as a width of the label, of the printing medium set in the image forming apparatus 10, a length of the label, an interval between the labels, a width of the base sheet, and a distance between edges of the base sheet and the label. The group of the setting values of the apparatus setting 15b may be basically the same as that of the job setting 38 described with reference to the printer driver 37. The job setting 15c is a group of setting values (including information indicating the printing area on the printing medium) according to the sheet setting command obtained from the print job analyzed by the command analysis section 12. The group of the setting values of the job setting 15c may be basically the same as that of the job setting 38. However, it is only necessary that the group of the setting values of the job setting 15c includes the setting values which are the same as those of the job setting 38.

The medium storage section (i.e., a medium storage device) 20 is configured to store the printing medium to be supplied to the printing section 22. The medium storage section 20 is constituted by, for example, a sheet cassette, a rolled paper storage portion, or the like. The image forming apparatus 10 may include a plurality of medium storage sections 20 so as to correspond to a plurality of kinds of printing media.

The medium detection section (i.e., a medium detector) 19 detects that the printing medium is set in the medium storage section 20, and measures a size of the printing medium (or the size of the printing medium and the printing area thereon), and outputs medium measurement information indicating the result of the measurement. The medium detection section 19 is used when the printing medium is set in the image forming apparatus 10. The medium detection section 19 has a function to detect (check) the length of the label of the printing medium set in the medium storage section 20, the interval between the labels or the like, in order to update the apparatus setting 15b in the medium setting 15a via the medium setting managing section 14. As shown in FIG. 1, the medium detection section 19 may be provided in the medium storage section 20. However, a part or all of the functions of the medium detection section 19 may be provided outside the medium storage section 20 and on a carrying path of the printing medium.

The communication section 18 is an interface for receiving the print job sent from the information processing apparatus 30 via the data communication channel N. It is only necessary that the communication section 18 has at least a function to receive the print job. That is, the communication section 18 may be a receiving section that receives the print job.

The command analysis section 12 is a processing section that analyzes the sheet setting command and a printing command included in the print job received by the communication section 18. A result of analysis of the sheet setting command is stored as the job setting 15c in the medium setting 15a by the medium setting managing section 14. As described above, content of the job setting 15c is the same as that of the job setting 38 of the information processing apparatus 30 at the time when the print job is created.

The determining section 13 is a processing section that compares the apparatus setting 15b and the job setting 15c held in the medium setting 15a, and determines whether the apparatus setting 15b and the job setting 15c differ from each other. The determining section 13 may also be called as a sheet setting comparing section.

The printing controller 21 controls the printing section 22, and causes the printing section 22 to perform printing based on the printing command obtained by analysis in the command analysis section 12 and the apparatus setting 15b stored in the storage section 15. The printing section 22 performs the printing on the printing medium.

As described above, the image forming apparatus 10 includes, as main components, the storage section 15 storing the apparatus setting (i.e., the second medium setting) 15b, the printing section 22 performing printing on the printing medium based on the apparatus setting 15b stored in the storage section 15, and the determining section 13 determining whether the first medium setting (i.e., the job setting 38, i.e., the job setting 15c) included in the print job differs from the second medium setting (i.e., the apparatus setting) 15b stored in the storage section 15 as the medium setting. The image forming apparatus 10 further includes a controller as described below.

When the determining section 13 determines that the job setting 15c (i.e., the first medium setting) and the apparatus setting 15b (i.e., the second medium setting) differ from each other, the controller (for example, the medium setting managing section 14) changes the medium setting stored in the storage section 15 from the apparatus setting 15b to the job setting 15c.

Therefore, when the image forming apparatus 10 receives the print job including the correct medium setting (i.e., the first medium setting such as the job setting 15c) from the information processing apparatus 30, and when the first medium setting (i.e., the job setting 15c) differs from the second medium setting (i.e., the apparatus setting 15b) set in the image forming apparatus 10, it becomes possible to change the medium setting from the second medium setting to the first medium setting. With such changing, error does not occur even when a next print job including the first medium setting is received.

Further, the printing medium used in the image forming apparatus 10 is preferably an elongated printing medium. This is because a lot of setting items (i.e., the medium setting 15a) are used for the elongated printing medium, and therefore a remarkable effect can be obtained by the embodiment. In this regard, when the image forming apparatus 10 is capable of performing printing on the elongated printing medium, it is preferable that the image forming apparatus 10 includes a cutting section such as a cutter which cuts the elongated printing medium. Further, the elongated printing medium may be rolled in the form of a roller. Furthermore, it is preferable that the printing medium includes a label and a base sheet. More setting items are used for the printing medium such as a rolled label sheet, and therefore a further remarkable effect can be obtained by the embodiment.

It is also possible that the command analysis section 12, the determining section 13 and the medium setting managing section 14 are part of a controller (for example, the main controller 11).

Next, printing processing on the printing sheet (i.e., an example of the printing medium) by the image forming apparatus 10 will be described.

Figure 3:
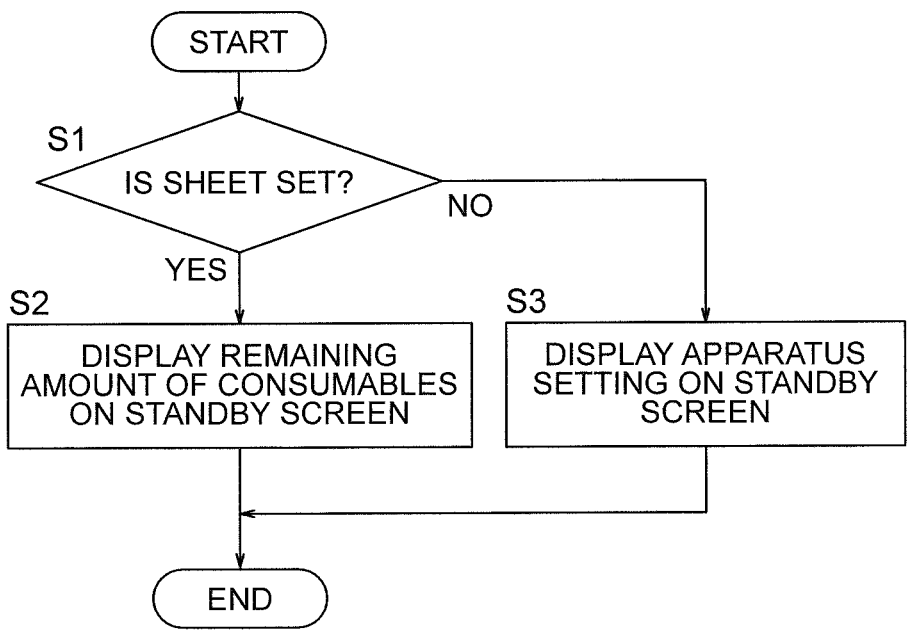
FIG. 3 is a flowchart showing an example of processing performed by an image forming apparatus of the image forming system shown in FIG. 1 when a printing medium is set in or taken out from the image forming apparatus.
Figure 4:
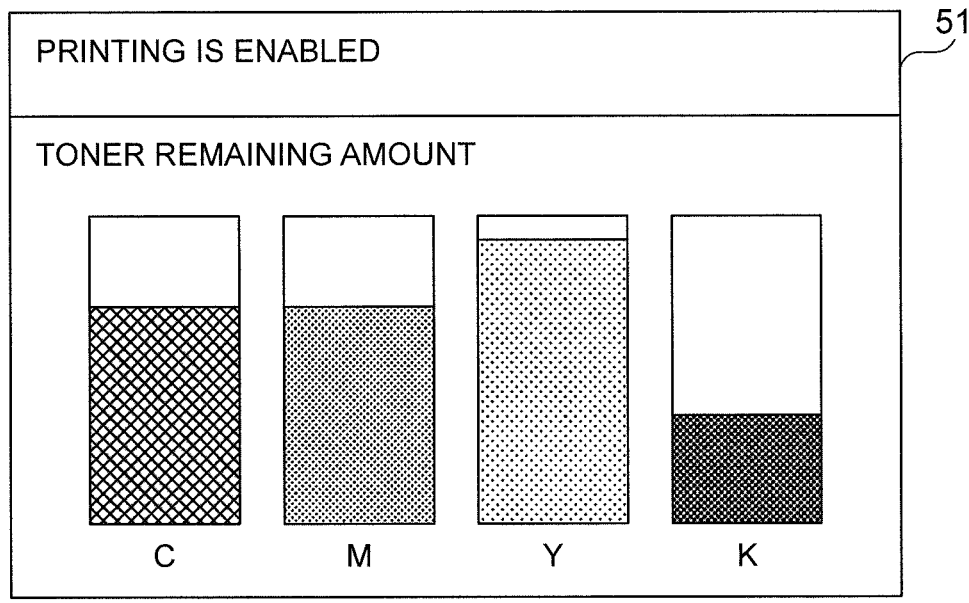
FIG. 4 is a schematic view showing an example of a standby screen displayed on a display section of the image forming apparatus in the processing shown in FIG. 3.
Figure 5:
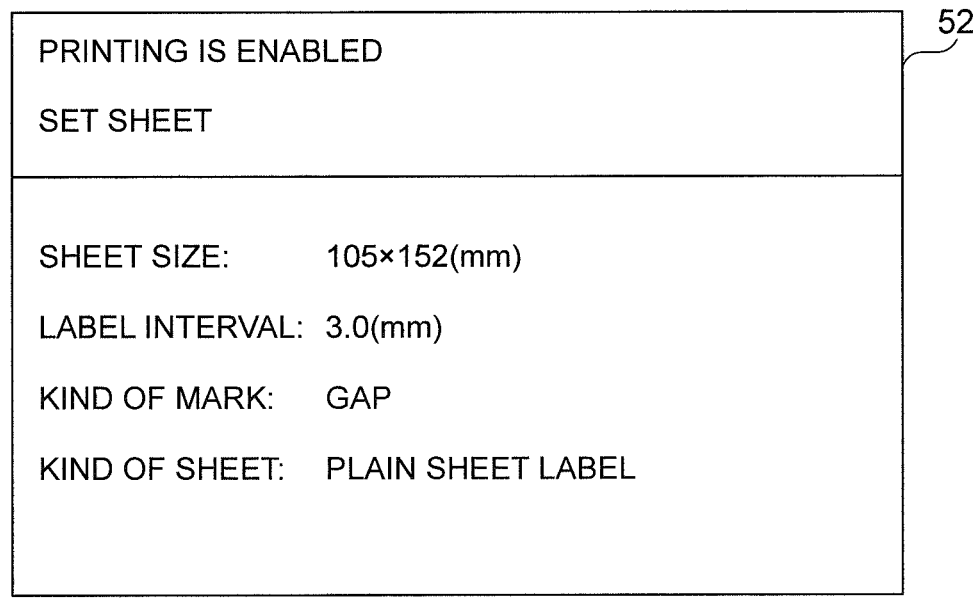
FIG. 5 is a schematic view showing another example of the standby screen displayed on the display section of the image forming apparatus in the processing shown in FIG. 3.

Processing in the case where the printing sheet is set in the image taming apparatus 10 or removed from the image forming apparatus 10 will be described with reference to FIGS. 3 to 5. FIG. 3 is a flowchart showing an example of the processing in the case where the printing sheet is set in the image forming apparatus 10 or removed from the image forming apparatus 10. FIGS. 4 and 5 are schematic views showing examples of images of standby screens displayed on the display section 17 shown in FIG. 3.

First, the medium setting managing section 14 receives a result of detection (referred to as a detection result) from the medium detection section 19, and determines whether the printing sheet is set in the image forming apparatus 10 (step S1). When the printing sheet is set (i.e., YES in step S1), the medium setting managing section 14 switches the standby screen (i.e., screen displayed in a standby mode) displayed on the display section 17 to a normal standby screen such as an image 51 shown in FIG. 4 indicating a remaining amount of consumables such as toner (step S2). When the printing sheet is not set (i.e., NO in step S1), the medium setting managing section 14 switches the standby screen displayed on the display section 17 to a standby screen such as an image 52 shown in FIG. 5 indicating a list of setting values of the apparatus setting 15b included in the medium setting 15a (step S3).

In this way, when the medium detection section 19 does not detect that the printing medium is set (stored) in the medium storage section 20, the medium setting managing section 14 displays the information indicating the medium setting (i.e., the sheet setting), i.e., the apparatus setting 15b at the time when setting of the printing medium is not detected. By viewing the image on the standby screen, a user can recognize the sheet setting of the printing sheet which is to be set (stored). That is, the user can recognize what kind of printing sheet is to be set.

Further display content of the standby screen is automatically switched according to presence or absence of the printing sheet in the processing shown in FIG. 3. Therefore, the user can check the list of the setting values of the apparatus setting 15b included in the medium setting 15a without operating the operation section 16 to select and display the setting value.

In this regard, even in a state where the printing sheet is set in the image forming apparatus 10, the user can change the display content of the standby screen to the standby screen showing the list of the setting value of the apparatus setting 15b in the medium setting 15a by pressing a predetermined button provided on the operation section 16.

Figure 6:
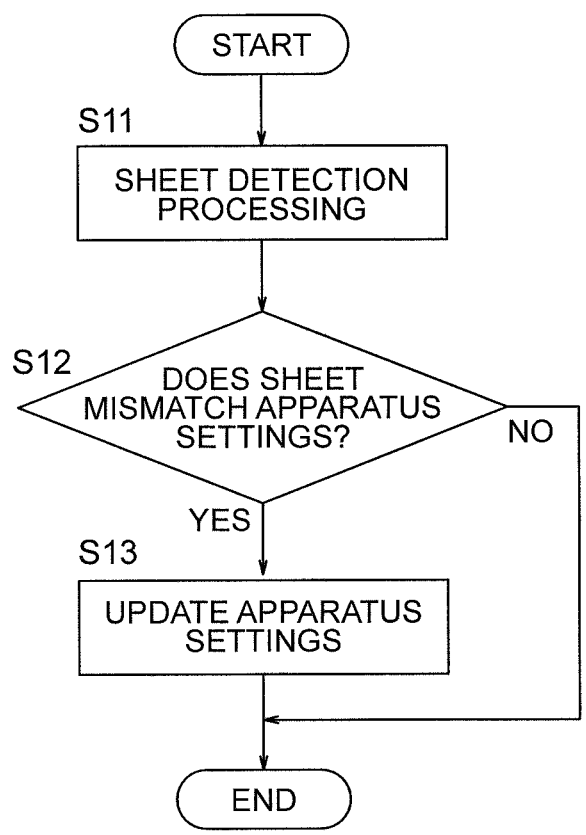
FIG. 6 is a flowchart showing an example of processing performed by the image forming apparatus of the image forming system shown in FIG. 1 when the printing medium is set in the image forming apparatus.

Next, an example of the processing performed when the printing sheet is set (stored) in the image forming apparatus 10 will be described with reference to FIG. 6. FIG. 6 is a flowchart showing an example of the processing performed when the printing sheet is set in the image forming apparatus 10.

First, the medium detection section 19 performs sheet detection processing (i.e., printing medium detection processing) for detecting the printing sheet set in the image forming apparatus 10 (step S11). The sheet detection processing may be performed by, for example, carrying the printing sheet while monitoring a sensor (of a transmission type or a reflection type) detecting a leading edge of the label of the rolled label sheet so as to measure a length of the label, an interval between the labels, or the like. Information obtained by the sheet detection processing is also referred to as medium measurement information.

Then, the determining section 13 determines whether the sheet setting indicated by the medium measurement information obtained by the sheet detection processing differs from the apparatus setting 15b (step S12). When the sheet setting indicated by the medium measurement information differs from the apparatus setting 15b (YES in step S12), i.e., when the printing sheet (set in the image forming apparatus 10) does not match the apparatus setting 15b, the medium setting managing section 14 updates (i.e., overwrites) the apparatus setting 15b with the sheet setting obtained by the sheet detection processing (step S13), and ends the processing. When the sheet setting indicated by the medium measurement information does not differ from the apparatus setting 15b (NO in step S12), the medium setting managing section 14 ends the processing. In this way, the medium setting managing section 14 can update the apparatus setting 15b (having been set as the medium setting) based on the medium measurement information output by the medium detection section 19.

By the processing shown in FIG. 6, at least the measurable sheet setting item is automatically updated when setting of the printing sheet is completed (i.e., when the printing sheet is set in the medium storage section 20, and the medium storage section 20 is returned to a certain position) without a requiring a user to operate the operation section 16 to select and change the setting value of the apparatus setting 15b included in the medium setting 15a.

Figure 7:
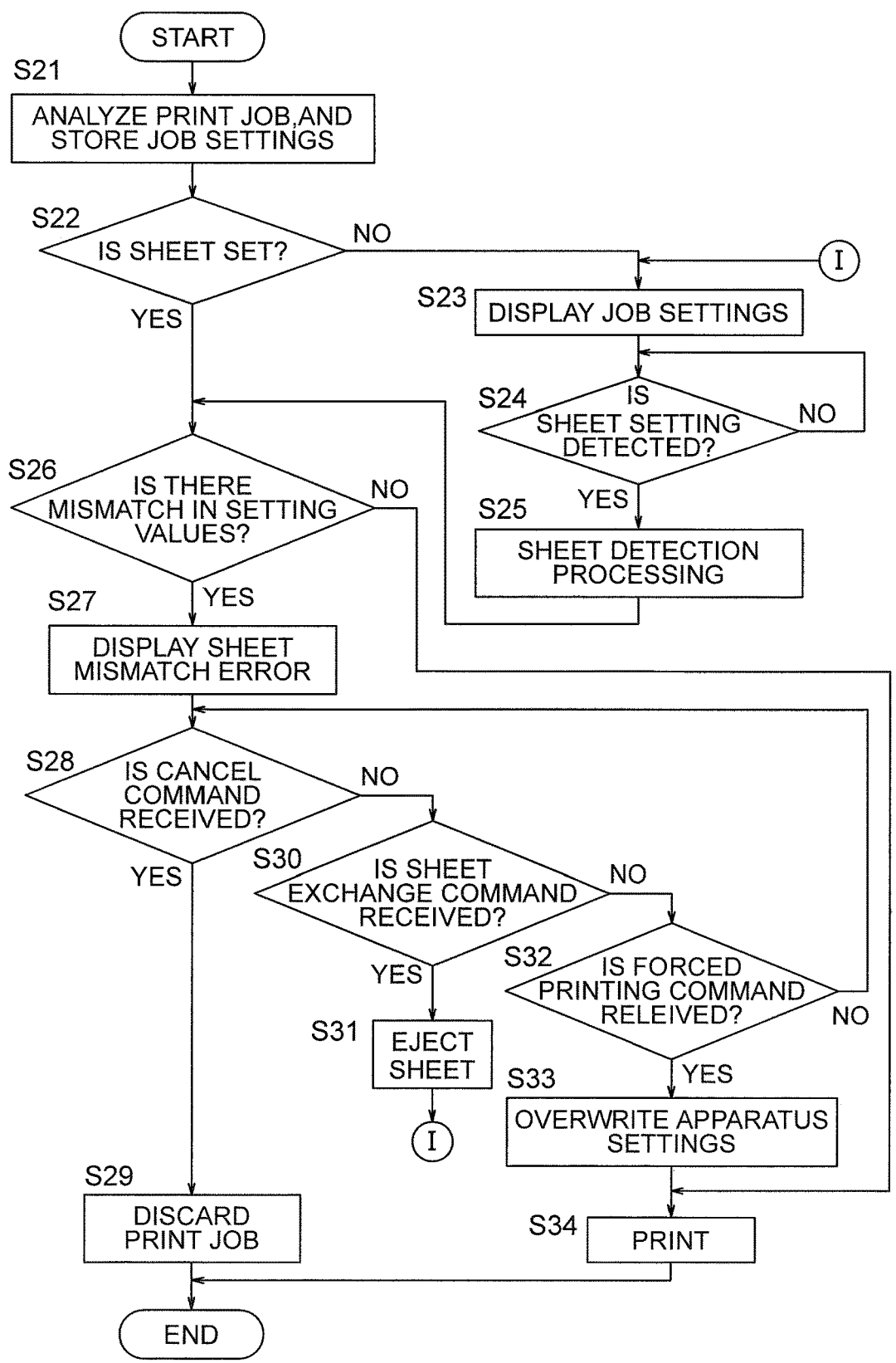
FIG. 7 is a flowchart showing an example of processing performed by the image forming apparatus of the image forming system shown in FIG. 1 when the image forming apparatus receives a print job from the information processing apparatus.
Figure 8:
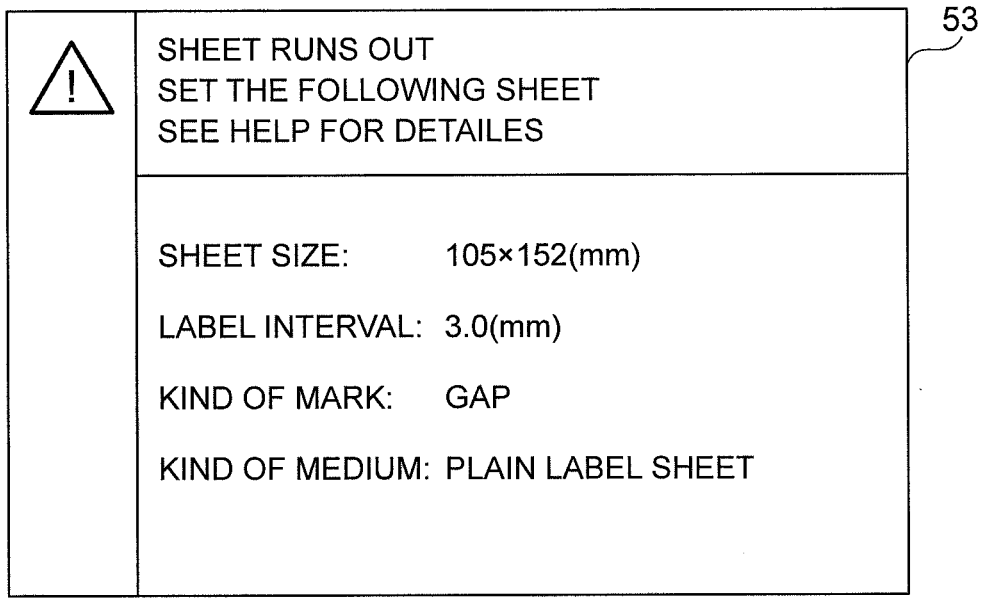
FIG. 8 is a flowchart showing an example of an error notification image displayed on the display section of the image forming apparatus in the processing shown in FIG. 7.
Figure 9:
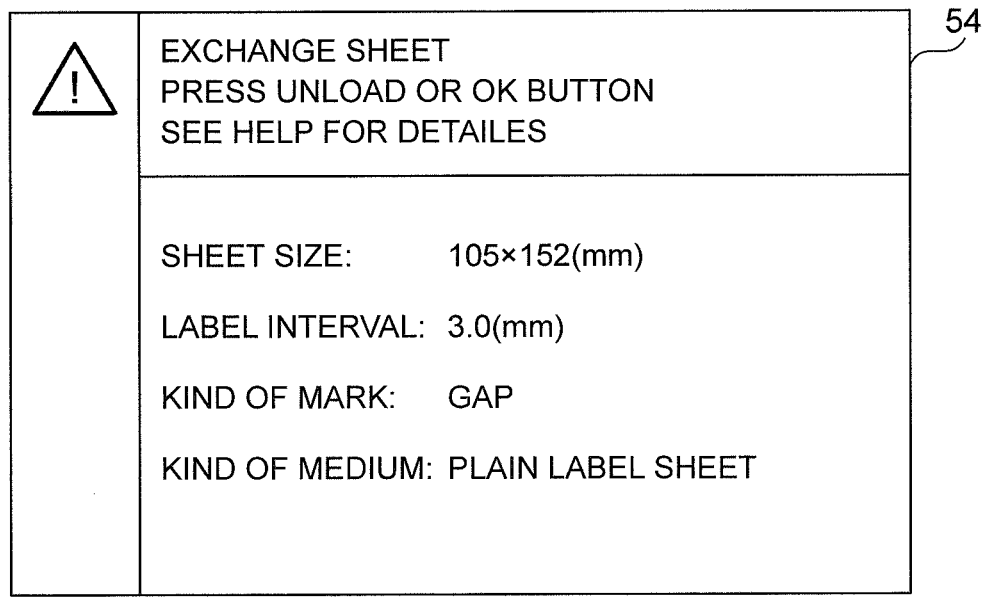
FIG. 9 is a flowchart showing another example of the error notification image displayed on the display section of the image, forming apparatus in the processing shown in FIG. 7.

Next, an example of processing performed when the image forming apparatus 10 receives the print job from the information processing apparatus 30 will be described with reference to FIGS. 7 to 9. This processing is a main feature of the image forming apparatus 10. FIG. 7 is a flowchart showing an example of the processing performed when the image forming apparatus 10 receives the print job from the information processing apparatus 30. FIGS. 8 and 9 are schematic views showing examples of an error notification image displayed on the display section 17 of the image forming apparatus 10 in the processing shown in FIG. 7.

First, the command analysis section 12 analyzes the command included in the print job received via the communication section 18 (step S21). Here, when the sheet setting command is included in the print job, the job setting 15c included in the medium setting 15a is updated according to the sheet setting command. In this regard, the job setting 15c having been obtained from the previously received print job may be deleted after a lapse of a predetermined time. In such a case, if the job setting 15c does not exist in step S21, new job setting 15c may be registered.

Then, the medium setting managing section 14 receives the detection result from the medium detection section 19, and determines whether the printing sheet is set in the image forming apparatus 10 (step S22). When the printing sheet is not set in the image forming apparatus 10 (i.e., NO in step S22), the medium setting managing section 14 causes the display section 17 to display an error image 53 shown in FIG. 8 (step S23). The error image 53 may include the list of the job setting 15c (i.e., the print job setting), and a notification statement indicating that the printing sheet is not set. In this way, when the print job is sent from the information processing apparatus 30, and when the medium detection section 19 does not detect setting of the printing medium in the medium storage section 20, the medium setting managing section 14 preferably causes the display section 17 to display information indicating the job setting 15c included in the print job. By viewing the error image 53, a user can recognize the sheet setting of the printing sheet to be set (stored). That is, the user can recognize what kind of printing sheet is to be set.

Then, the medium setting managing section 14 receives the detection result from the medium detection section 19, and determines whether the printing sheet is set (step S24). Step S24 is also referred to as a sheet setting waiting state. When setting of the printing sheet is detected, the medium setting managing section 14 performs the sheet detection processing shown in FIG. 6 (step S25). Although not shown in FIG. 7, when a cancel button provided on the operation section 16 is pressed in the sheet setting waiting state, the sheet setting waiting state may be cancelled, and the received print job may be discarded.

When the printing sheet is set in step S22, or when the setting of the printing sheet is detected in step S24 and the sheet detection processing is performed in step S25, the determining section 13 determines whether there is a mismatch between the apparatus setting 15b and the job setting 15c (step S26). When the apparatus setting 15b and the job setting 15c match each other (NO in step S26), the main controller 11 instructs the printing controller 21 to perform printing. The printing controller 21 controls the printing section 22 to perform printing (step S34). Then, the processing ends.

In contrast, when the apparatus setting 15b and the job setting 15c do not match each other (YES in step S26), the medium setting managing section 14 causes the display section 17 to display an error image 54 as shown in FIG. 9 (step S27). The error image 54 may include a notification statement notifying a mismatch error of the printing sheet. Further, the error image 54 may include a list of setting items of the job setting 15c which are different from the setting items of the apparatus setting 15b. In this way, the user can recognize the mismatching setting items. That is, the user can recognize the sheet setting of the printing sheet to be set. In other words, the user can recognize what kind of printing sheet is to be set.

Further, the display section 17 may display information indicating the difference between the job setting 15c and the apparatus setting 15b other than the above described list. In this case, when the printing job is sent from the information processing apparatus 30 and when the medium detection section 19 detects that the printing medium is set in the medium storage section 20, the medium setting managing section 14 may obtain such information by determining whether the job setting 38 (i.e., the job setting 15c) included in the print job differs from the apparatus setting 15b.

Further, as described with reference to FIG. 6, the medium setting managing section 14 may perform such processing when the medium setting managing section 14 updates the apparatus setting 15b (set as the medium setting) based on the medium measurement information output by the medium detection section 19 (i.e., when the step S25 shown in FIG. 7 is performed).

Further, the medium setting managing section 14 determines whether the cancel button of the operation section 16 is pressed (i.e., whether cancellation of printing is instructed) while the display section 17 displays the error image 54 (step S28). When the cancel button of the operation section 16 is pressed (YES in step S28), the medium setting managing section 14 cancels printing, resets the error state, and discards the print job (step S29). Then, the processing ends.

Further, the medium setting managing section 14 determines whether a sheet exchange button provided on the operation section 16 is pressed (i.e., whether exchange of the printing sheet is instructed) while the display section 17 displays the error image 54 (step S30). When the sheet exchange button is pressed (YES in step S30), it means that a correct printing sheet need be set in order to solve the error state. Therefore, the medium setting managing section 14 ejects the printing sheet to enable exchange of the printing sheet (step S31). Then, the medium setting managing section 14 returns to step S23, and causes the display section 17 to display the error image 53. Steps after step S23 are as described above.

Further, the medium setting managing section 14 determines whether an OK button (i.e., a printing execution button) provided on the operation section 16 is pressed (i.e., whether forced printing is instructed) while the display section 17 displays the error image 54 (step S32). When the OK button of the operation section 16 is pressed (YES in step S32), the medium setting managing section 14 overwrites the apparatus setting 15b with the job setting 15c (step S33), and proceeds to step S34. The job setting 15c has been updated in step S21, and has the same content as the job setting 38. In this way, when the determining section 13 determines that there is a mismatch between the apparatus setting 15b and the job setting 15c, and when the instruction to perform printing (referred to as "forced printing" since it is performed after the error notification) is input from the operation section 16, the medium setting managing section 14 preferably changes the medium setting stored in the storage section 15 from the apparatus setting 15b to the job setting 15c.

Then, the medium setting managing section 14 causes the printing controller 21 to perform printing (i.e., forced printing) ignoring the sheet mismatch error, i.e., the error image 54 displayed on the display section 17. The printing controller 21 causes the printing section 22 to perform printing (step S34), and ends the processing. It is also possible to perform step S34 prior to step S33.

Some setting item of the sheet setting is difficult (or impossible) to automatically detect upon setting of the printing sheet. Further, the user may fail to update such a setting item of the apparatus setting 15b upon exchanging the printing sheet, and may correctly set the job setting 38 (i.e., the sheet setting) using the printer driver 37. In such a case, the apparatus setting 15b of the image forming apparatus 10 may not match the job setting 15c updated based on the job setting 38 (i.e., the sheet setting command of the print job) specified using the printer driver 37 and sent to the image forming apparatus 10. Therefore, even if the printing sheet set in the image forming apparatus 10 matches the job setting 38 specified using the printer driver 37, the sheet mismatch error may occur. By processing in step S33, the apparatus setting 15b can be updated to a correct setting, and printing (i.e., forced printing) can be performed.

That is, when forced printing is performed, the sheet setting of the image forming apparatus 10 is overwritten with the sheet setting (i.e., the job setting 38) specified using the printer driver 37, and therefore the printing sheet actually set in the image forming apparatus 10 matches the sheet setting of the image forming apparatus 10. Therefore, a printing failure can be prevented from occurring. Further, the sheet setting of the image forming apparatus 10 can be updated without requiring a user to operate the operating section 16 to update the sheet setting.

Further, the job setting 38 specified using the printer driver 37 is reflected on the apparatus setting 15b via the job setting 15c by performing printing. Therefore, the sheet setting of the image forming apparatus 10 can be updated without requiring a user to operate the operation section 16 to select and change the setting values of the apparatus setting 15b in advance.

Further, although the instruction to perform forced printing is input from the operation section 16 in step S32, the image forming apparatus 10 may also be configured to receive an instruction to perform forced printing from the information processing apparatus 30. To be more specific, when the determining sections 13 determines that the apparatus setting 15b does not match the job setting 15c, the medium setting managing section 14 may send an inquiry to the information processing apparatus 30 to inquire whether to perform forced printing. Further, when the image forming apparatus 10 receives a reply instructing to perform force printing from the information processing apparatus 30 via the communication section 18, the image forming apparatus 10 preferably changes the medium setting stored in the storage section 15 from the second medium setting (i.e., the apparatus setting 15b) to the first medium setting (i.e., the job setting 15c).

As described above, the image forming apparatus 10 of the image forming system 1 of the embodiment employs the setting method including:

(1) determining whether the first medium setting (i.e., the job setting 15c) included in the print job sent from the information processing apparatus 30 and including information representing the printing area on the printing medium differs from the second medium setting (i.e., the apparatus setting 15b) stored as the medium setting in the storage section 15 of the image forming apparatus 10, and (2) changing the medium setting stored in the storage section 15 from the second medium setting (i.e., the apparatus setting 15b) to the first medium setting (i.e., the job setting 15c), when it is determined that the first medium setting differs from the second medium setting the determining step.

Modifications of the setting method are the same as those e forming system 1.

Further, the image forming apparatus 10 may be achieved by installing a program (i.e., a computer program) in a controller (for example, the medium setting managing section 14 or the main controller 11).

The program causes the controller to perform processing including the steps of:

(1) determining whether the first medium setting (i.e., the job setting 15c) included in the print job sent from the formation processing apparatus 30 and including information representing the printing area on the printing medium differs from the second medium setting (i.e., the apparatus setting 15b) stored as the medium setting in the storage section 15 of the image forming apparatus 10; and (2) changing the medium setting stored in the storage section 15 from the second medium setting (i.e., the apparatus setting 15b) to the first medium setting (i.e., the job setting 15c), when, it is determined that the first medium setting differs from the second medium setting in the determining step.

The program may be recorded in a non-transitory computer-readable medium. Alternatively, the program may be provided from a server through a network.

In the above described embodiment, the sheet setting is notified from the information processing apparatus 30 to the image forming apparatus 10. However, it is also possible that the image forming apparatus 10 notifies the information processing apparatus 30 of the sheet setting automatically detected upon setting of the printing sheet (FIG. 6), and reflects the notified sheet setting on the job setting 38 of the information processing apparatus 30. That is, the image forming apparatus 10 may notify the information processing apparatus 30 of the medium measurement information obtained by the medium detection section 19, and the information processing apparatus 30 may update the job setting 38 based on the medium measurement information.

While the preferred embodiments of the present invention have been illustrated in detail, it should be apparent that modifications and improvements may be made to the invention without departing from the spirit and scope of the invention as described in the following claims.

What is claimed is:

1. An image forming apparatus comprising:
   a storage section that stores a medium setting including information representing a printing area on a printing medium;
   a printing section that performs printing on the printing medium based on the medium setting stored in the storage section; and
   a controller,
   wherein the controller determines whether a first medium setting included in a print job sent from an information processing apparatus and including information representing a printing area on a printing medium differs from a second medium setting stored as the medium setting in the storage section; and
   wherein when the first medium setting differs from the second medium setting, the controller checks if a predetermined printing instruction is received and changes the medium setting stored in the storage section from the second medium setting to the first medium setting when the predetermined printing instruction is received.

2. The image forming apparatus according to claim 1, further comprising an operation section that accepts a user's operation,
   wherein when the operation section accepts a print command after the controller determines that the first medium setting differs from the second medium setting, the controller changes the medium setting stored in the storage section from the second medium setting to the first medium setting.

3. The image forming apparatus according to claim 2, wherein when the operation section accepts an input of the second medium setting, the storage section stores the second medium setting.

4. The image forming apparatus according to claim 1, further comprising:

a medium storage section that stores a printing medium to be supplied to the printing section; and
a medium detector that detects that the printing medium is set in the medium storage section,
wherein the medium detector measures a size of the printing medium or the size of the printing medium and a printing area, and outputs medium measurement information representing a result of measurement,
wherein the controller updates the second medium setting stored as the medium setting in the storage section based on the medium measurement information output by the medium detector.

5. The image forming apparatus according to claim 1, further comprising a display section,
wherein when the print job is received from the information processing apparatus, and when the medium detector detects that the printing medium is set in the medium storage section, the controller determines whether the first medium setting included in the print job differs from the second medium setting,
wherein when the controller determines that the first medium setting differs from the second medium setting, the display section displays information indicating that the first medium setting and the second medium setting differ from each other.

6. The image forming apparatus according to claim 5, wherein the medium detector does not detect that the printing medium is set in the medium storage section, the controller causes the display section to display information indicating the medium setting.

7. The image forming apparatus according to claim 5, wherein when the controller receives the print job from the information processing apparatus, and when the medium detector does not detect that the printing medium is set in the medium storage section, the controller causes the display section to display the first medium setting included in the print job.

8. The image forming apparatus according to claim 1, wherein the print medium is an elongated printing medium.

9. The image forming apparatus according to claim 1, wherein the printing medium is a rolled medium.

10. The image forming apparatus according to claim 1, wherein the printing medium includes a label and a base sheet.

11. The image forming apparatus according to claim 1, wherein the controller does not perform printing when the first medium setting differs from the second medium setting and predetermined printing instruction is not received.

12. The image forming apparatus according to claim 1, wherein the predetermined printing instruction is an instruction to perform forced printing.

13. The image forming apparatus according to claim 1, further comprising an operation section that accepts a user's operation,
wherein the second medium setting is inputted by a user at the operation section.

14. An image forming system comprising an information processing apparatus and an image forming apparatus,
the information processing apparatus comprising a sending section that sends a print job to the image forming apparatus, the print job including a first medium setting including information representing a printing area on a printing medium,
the image forming apparatus comprising:
a storage section that stores a medium setting including information representing the printing area on the printing medium;
a printing section that performs printing on the printing medium based on the medium setting stored in the storage section;
a receiving section that receives the print job sent from the information processing apparatus; and
a controller,
wherein the controller determines whether a first medium setting included in the print job received by the receiving section differs from a second medium setting stored as the medium setting in the storage section; and
wherein when the first medium setting differs from the second medium setting, the controller checks if a predetermined printing instruction is received and changes the medium setting stored in the storage section from the second medium setting to the first medium setting when the predetermined printing instruction is received.

15. A setting method for an image forming apparatus, the method comprising the steps of:
determining whether a first medium setting included in a print job sent from an information processing apparatus and including information representing a printing area on a printing medium differs from a second medium setting stored as a medium setting in a storage section of the image forming apparatus;
checking if a predetermined printing instruction is received when it is determined that the first medium setting differs from the second medium setting; and
changing the medium setting stored in the storage section from the second medium setting to the first medium setting when the predetermined printing instruction is received.

16. A computer-readable medium storing a computer program and mounted in an image forming apparatus,
the image forming apparatus comprising:
a storage section that stores a medium setting including information representing a printing area on a printing medium;
a printing section that performs printing on the printing medium based on the medium setting stored in the storage section; and
a controller,
the computer program causing the controller to perform processing comprising the steps of:
determining whether a first medium setting included in a print job sent from an information processing apparatus and including information representing a printing area on a printing medium differs from a second medium setting stored as a medium setting in the storage section of the image forming apparatus;
checking if the predetermined printing instruction is received when it is determined that the first medium setting differs from the second medium setting; and
changing the medium setting stored in the storage section from the second medium setting to the first medium setting when the predetermined printing instruction is received.

* * * * *